US009148653B2

(12) United States Patent
Nanri et al.

(10) Patent No.: US 9,148,653 B2
(45) Date of Patent: Sep. 29, 2015

(54) STEREO IMAGE PROCESSING DEVICE AND STEREO IMAGE PROCESSING METHOD

(75) Inventors: Takuya Nanri, Kanagawa (JP); Kensuke Maruya, Osaka (JP); Hisashi Kurokawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 391 days.

(21) Appl. No.: 13/883,141

(22) PCT Filed: Nov. 1, 2011

(86) PCT No.: PCT/JP2011/006113

§ 371 (c)(1),
(2), (4) Date: May 2, 2013

(87) PCT Pub. No.: WO2012/060093

PCT Pub. Date: May 10, 2012

(65) Prior Publication Data

US 2013/0215232 A1 Aug. 22, 2013

(30) Foreign Application Priority Data

Nov. 5, 2010 (JP) ................. 2010-248691

(51) Int. Cl.
*H04N 13/02* (2006.01)
*G01C 11/06* (2006.01)
*G06T 7/00* (2006.01)

(52) U.S. Cl.
CPC ............ *H04N 13/0271* (2013.01); *G01C 11/06* (2013.01); *G06T 7/0036* (2013.01); *G06T 7/0075* (2013.01); *G06T 2207/10012* (2013.01); *G06T 2207/20021* (2013.01); *G06T 2207/20056* (2013.01); *G06T 2207/30196* (2013.01); *G06T 2207/30261* (2013.01)

(Continued)

(58) Field of Classification Search
None
See application file for complete search history.

(56) References Cited

U.S. PATENT DOCUMENTS

2002/0012459 A1\* 1/2002 Oh ................................ 382/154
2009/0207235 A1\* 8/2009 Francini et al. ................. 348/46

(Continued)

FOREIGN PATENT DOCUMENTS

JP 11-175725 A 7/1999
JP 2000-171214 A 6/2000

(Continued)

OTHER PUBLICATIONS

International Search Report for PCT/JP2011/006113 dated Jan. 31, 2012.

*Primary Examiner* — Tsung-Yin Tsai
(74) *Attorney, Agent, or Firm* — Pearne & Gordon LLP

(57) ABSTRACT

An image segmenting unit (401) in the stereo image processing device (100) extracts M (a natural number between 2 and N, inclusive) number of segmented target images wherein a first partial area within a target image has been segmented into N (a natural number of 2 or more), and also extracts M number of segmented reference images wherein a second partial area within a reference image has been segmented into N. An image concatenating unit (402) serially concatenates M data strings, each comprising a intensity value from each segmented target image, to form a first image data string and also serially concatenates M data strings, each comprising a intensity value from each segmented reference image, to form a second image data string. A filtering unit (403) and a peak position detection unit (104) calculate the disparity between the standard images and the reference images.

6 Claims, 17 Drawing Sheets

(56) References Cited

U.S. PATENT DOCUMENTS

2009/0304266 A1* 12/2009 Aoki et al. .................... 382/154
2012/0026165 A1* 2/2012 Morifuji ....................... 345/419
2012/0026295 A1* 2/2012 Nishimura et al. ............. 348/46

FOREIGN PATENT DOCUMENTS

| JP | 2008-123141 A | 5/2008 |
|----|---------------|--------|
| WO | 2010/113389 A1 | 10/2010 |
| WO | 2012/001982 A1 | 1/2012 |

* cited by examiner

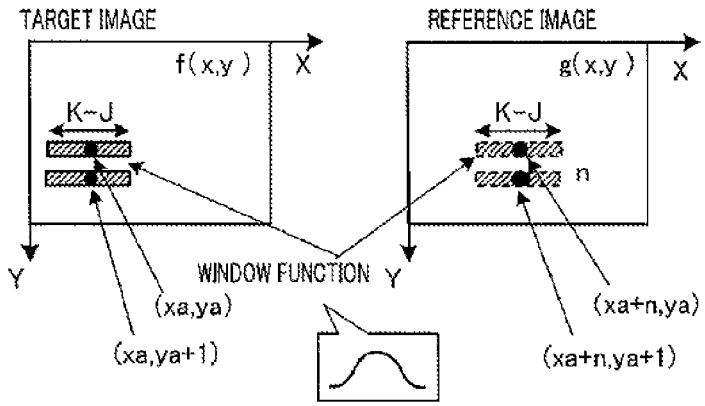

$$f'(m) = f(xa+m, ya) \times \frac{1}{2}\left\{\cos(\pi\frac{m}{K-J})+1\right\}$$

$$f''(m) = f(xa+m, ya+1) \times \frac{1}{2}\left\{\cos(\pi\frac{m}{K-J})+1\right\}$$

$$\Rightarrow \quad \tilde{f} = \begin{cases} f'(m) & (0 \le m \le K-J) \\ f''(m-(K-J+1)) & (K-J+1 \le m \le 2(K-J)+1) \end{cases}$$

$$g'(m) = g(xa+n+m, ya) \times \frac{1}{2}\left\{\cos(\pi\frac{m}{K-J})+1\right\}$$

$$g''(m) = g(xa+n+m, ya+1) \times \frac{1}{2}\left\{\cos(\pi\frac{m}{K-J})+1\right\}$$

$$\Rightarrow \quad \tilde{g} = \begin{cases} g'(m) & (0 \le m \le K-J) \\ g''(m-(K-J+1)) & (K-J+1 \le m \le 2(K-J)+1) \end{cases}$$

$$z(m) = \sum_{k=0}^{2(K-J)+1} \tilde{f}(-k) \times \tilde{g}(m-k)$$

FIG. 6

STEREO IMAGE PROCESSING DEVICE AND STEREO IMAGE PROCESSING METHOD

TECHNICAL FIELD

The present invention relates to a stereo image processing apparatus and stereo image processing method that compute disparity based on stereo images (a target image and a reference image) capturing the same object.

BACKGROUND ART

There are known stereo image processing apparatuses that compute image shifts based on two images (a target image and a reference image) of an object taken by a stereo camera, and compute the distance to the object based on that shifts. Applying of stereo image processing apparatuses to vehicle-mounted apparatuses is being considered, where the distance to a vehicle or a pedestrian is measured based on stereo images including the vehicle or the pedestrian, for example. However, due to the reduction in the sizes of cameras (e.g., vehicle-mounted cameras) in recent years, camera separations are also becoming smaller, as a result of which disparities between stereo images are also becoming smaller. Accordingly, accurate disparity computation functionality is beginning to be demanded of stereo image processing apparatuses.

As an accurate stereo matching (disparity computation in stereo image processing) scheme, a one-dimensional phase-only correlation (POC) scheme has been proposed, for example (see Patent Literature 1, for example). In a one-dimensional POC scheme, partial images (one-dimensional image data sequences) are extracted from a target image and a reference image using the Hann window. The extracted partial target image and partial reference image undergo a one-dimensional Fourier transform, and are combined. The combined image data has its amplitude components normalized, and undergoes a one-dimensional inverse Fourier transform. Thus, phase-only correlation coefficients are computed, and the shift between the images (i.e., the disparity) is computed based on a correlation peak of the phase-only correlation coefficients.

CITATION LIST

Patent Literature

PTL 1
Japanese Patent Application Laid-Open No. 2008-123141

SUMMARY OF INVENTION

Technical Problem

However, with the related art above, it is difficult to accurately compute disparity with regard to objects with small image region sizes in the base line direction in stereo images (e.g., pedestrians in the distance). This is because, when the image region size in the base line direction is small, the one-dimensional image data sequence has to be made small in order to reduce the impact of peripheral regions. However, the smaller a one-dimensional image data sequence is, the lower the accuracy of the correlation peaks becomes.

An object of the present invention is to provide a stereo image processing apparatus and stereo image processing method that enable accurate disparity computation for an object with a small image region in the base line direction.

Solution to Problem

A stereo image processing apparatus according to one aspect of the present invention is a stereo image processing apparatus that computes a shift between a target image and a reference image that form stereo images, the stereo image processing apparatus including: an extraction section that extracts M many divisional target images obtained by dividing a first partial region in the target image into N parts (where N is a natural number equal to or greater than 2, and M is a natural number equal to or greater than 2 but equal to or less than N), and extracts M many divisional reference images obtained by dividing a second partial region in the reference image corresponding to the first partial region in the target image into N parts; a concatenating section that forms a first concatenated data sequence by concatenating, in series, M many data sequences, each of which includes intensity values of a corresponding one of the divisional target images, and forms a second concatenated data sequence by concatenating, in series, M many data sequences, each of which includes intensity values of a corresponding one of the divisional reference images; a filtering section that computes inverted phase filter coefficients by reversing the data order of the first concatenated data sequence, and performs filtering on the second concatenated data sequence using the inverted phase filter coefficients; and a computation section that computes the shift based on a peak position in a filtering result of the filtering section.

A stereo image processing method according to one aspect of the present invention is a stereo image processing method that computes a shift between a target image and a reference image that form stereo images, the stereo image processing method including: extracting M many divisional target images obtained by dividing a first partial region in the target image into N parts (where N is a natural number equal to or greater than 2, and M is a natural number equal to or greater than 2 but equal to or less than N), and extracting M many divisional reference images obtained by dividing a second partial region in the reference image corresponding to the first partial region in the target image into N parts; forming a first concatenated data sequence by concatenating, in series, M many data sequences, each of which includes intensity values of a corresponding one of the divisional target images, and forming a second concatenated data sequence by concatenating, in series, M many data sequences, each of which includes intensity values of a corresponding one of the divisional reference images; computing inverted phase filter coefficients by reversing the data order of the first concatenated data sequence, and performing filtering on the second concatenated data sequence using the inverted phase filter coefficients; and computing the shift based on a peak position in a result of the filtering.

Advantageous Effects of Invention

With the present invention, it is possible to provide a stereo image processing apparatus and stereo image processing method that enable accurate disparity computation for an object with a small image region size in the base line direction.

BRIEF DESCRIPTION OF DRAWINGS

FIG. 6 is a diagram illustrating a concept of a subpixel-level computation process;

DESCRIPTION OF EMBODIMENTS

Figure 1:
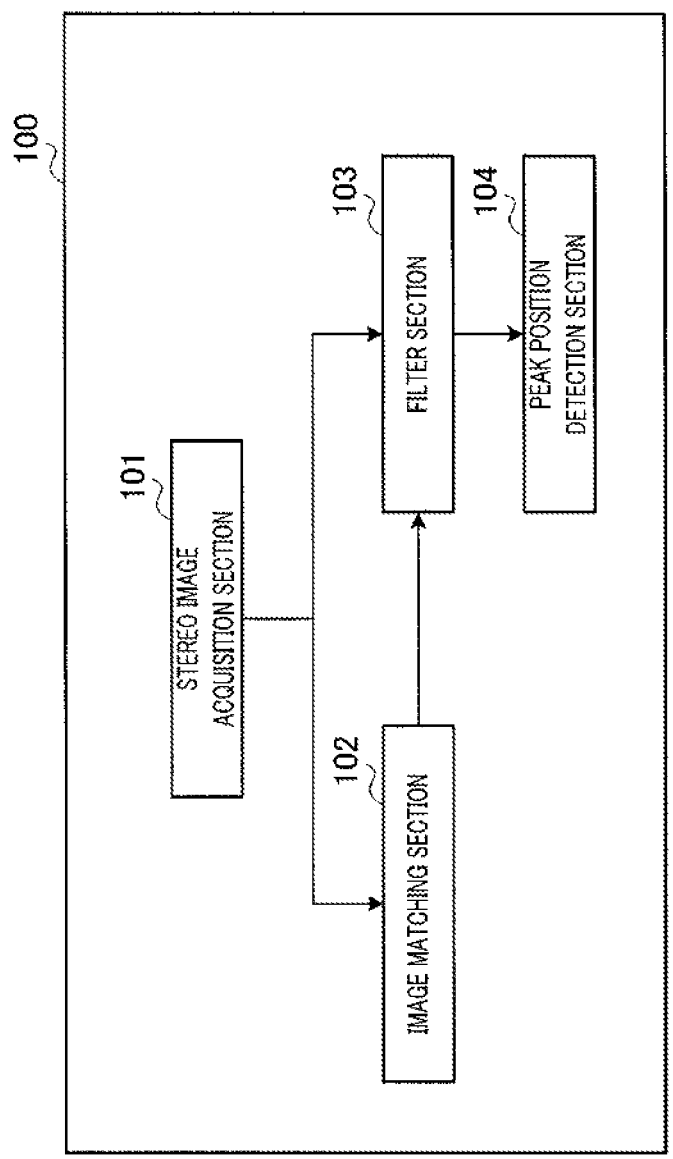
FIG. 1 is a block diagram showing a configuration of a stereo image processing apparatus according to Embodiment 1 of the present invention.

Embodiments of the present invention are described in detail below with reference to the drawings. With respect to the embodiments, like elements are designated with like reference numerals, while omitting redundant descriptions thereof. The descriptions below assume that the X-axis represents the horizontal direction in the image, that the Y-axis represents the vertical direction in the image, and that one coordinate point represents one pixel.

Embodiment 1

[Configuration of Stereo Image Processing Apparatus 100]

FIG. 1 shows a configuration of stereo image processing apparatus 100 according to Embodiment 1 of the present invention. With respect to FIG. 1, stereo image processing apparatus 100 includes stereo image acquisition section 101, image matching section 102, filter section 103, and peak position detection section 104.

Stereo image acquisition section 101 acquires stereo images taken with two or more imaging systems (i.e., cameras). The stereo images include a target image and a reference image in which the same object (target) is captured by two distinct imaging systems. With respect to the present embodiment, stereo images are assumed to be images taken by two cameras whose base line direction generally coincides with the horizontal direction. Stereo image acquisition section 101 may be, for example, an input terminal of a circuit apparatus.

Image matching section 102 acquires the stereo images from stereo image acquisition section 101, and performs an imaging matching process with respect to the target image and the reference image. Thus, a pixel-level corresponding point in the reference image, which corresponds to a target point in the target image, is extracted. Image matching section 102 computes "pixel-level shift n" between the target image and the reference image.

The "disparity" between the target image and the reference image that is obtained at peak position detection section 104 (which is described hereinbelow) is measured in subpixels. In other words, the shift between the target image and the reference image is coarsely detected "in pixels" at image matching section 102, and the shift between the target image and the reference image is finely detected "in subpixels" at peak position detection section 104.

Specifically, image matching section 102 extracts from the target image a partial image (hereinafter referred to as a "unit partial target image") including a "target point," which is a predetermined pixel included in the target image. Image matching section 102 also extracts from the reference image a plurality of partial images (hereinafter referred to as "unit partial reference images") of the same size as the unit partial target image. The plurality of unit partial reference images are extracted from different positions in the reference image.

In the case of a stereo camera, the disparity between the target image and the reference image only occurs in the base line direction of the camera. Accordingly, image matching section 102 extracts the plurality of unit partial reference images by varying the extraction position in the base line direction. The shift between the position of the target point in the target image and the position of the corresponding point in the reference image is computed as shift n mentioned above.

Image matching section 102 then identifies, from among the plurality of extracted unit partial reference images, the unit partial reference image that results in the greatest level of match with respect to the unit partial target image. With respect to the thus identified unit partial reference image, the one pixel corresponding to the "target point" is the "pixel-level corresponding point" in the reference image. As an index representing the level of match, a sum of absolute differences (SAD) value, which signifies intensity difference, may be used, for example.

Filter section 103 acquires the stereo images from stereo image acquisition section 101. Filter section 103 also acquires the target point and shift n from image matching section 102.

Based on the target image, filter section 103 computes filter coefficients, and, using the computed filter coefficients, performs a filtering process on the reference image. Specifically, filter section 103 computes the filter coefficients based on the target image and the position of the target point. Furthermore, using the computed filter coefficients, filter section 103 performs a filtering process around the pixel-level corresponding point in the reference image, and outputs the filtering result to peak position detection section 104. The filter coefficients are referred to as "inverted phase filter coefficients."

Figure 2:
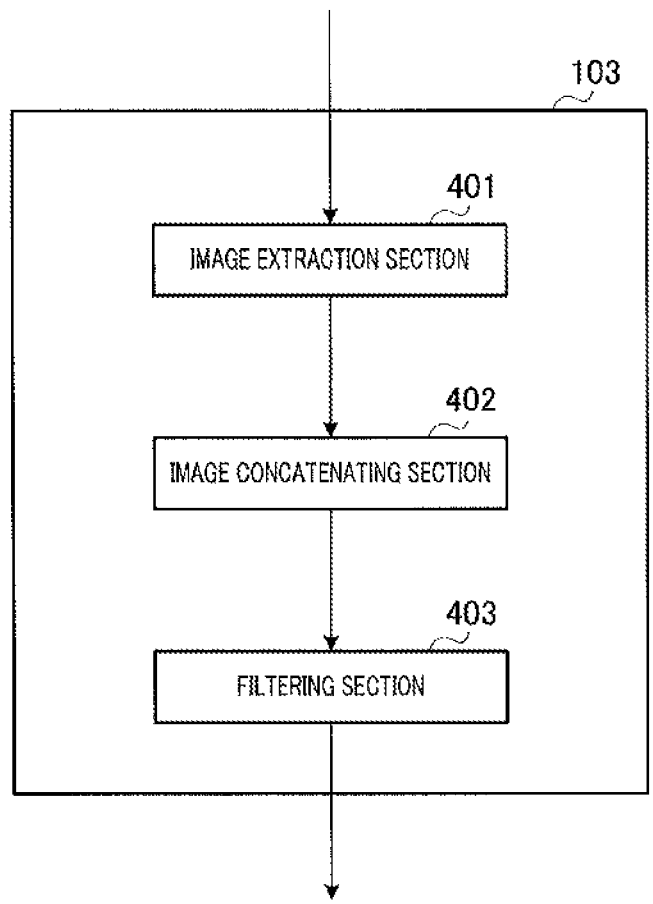
FIG. 2 is a block diagram showing a configuration of a filter section.

FIG. 2 shows a configuration of filter section 103. With respect to FIG. 2, filter section 103 includes image extraction section 401, image concatenating section 402, and filtering section 403.

Image extraction section 401 extracts, from the target image and as unit partial target images for subpixel estimation, partial images including a plurality of pixel rows, which are parallel to the base line direction of the stereo images, and a plurality of pixel columns. Image extraction section 401 likewise extracts, from the reference image and as unit partial reference images for subpixel estimation, partial images including the same pixel rows and pixel columns as (i.e., of the same size as) unit partial target images for subpixel estimation.

Image extraction section 401 then outputs to image concatenating section 402 unit partial target images for subpixel estimation and unit partial reference images for subpixel estimation.

For the present embodiment, image extraction section 401 determines the image extraction position in the target image in such a manner as to include the target point in unit partial target images for subpixel estimation. Image extraction section 401 determines the image extraction position in such manner as to include the pixel-level corresponding point in unit partial reference images for subpixel estimation.

Specifically, image extraction section 401 extracts, from the unit partial target image, M many N-part unit partial target images obtained by dividing the unit partial target image into N parts (where N is a natural number equal to or greater than 2, and M is a natural number equal to or greater than 2 but equal to or less than N). Similarly, image extraction section 401 extracts, from the unit partial reference image with the greatest level of match with respect to the unit partial target image, M many N-part unit partial reference images obtained by dividing the unit partial reference image into N parts (where N is a natural number equal to or greater than 2). In other words, unit partial target images for subpixel estimation are N-part unit partial target images obtained by dividing the unit partial target image into N parts in the direction of the Y-axis. Unit partial reference images for subpixel estimation are N-part unit partial reference images obtained by dividing the unit partial reference image with the greatest level of match with respect to the unit partial target image into N parts in the direction of the Y-axis. Image extraction section 401 sets the value of M and the value of N based on shift n computed at image matching section 102. In order to reduce the computation amount, image extraction section 401 may also uniformly set the value of M and the value of N.

The direction for extracting unit partial target images for subpixel estimation and unit partial reference images for subpixel estimation is a direction parallel to the epipolar lines of the stereo images. The positions for extracting unit partial target images for subpixel estimation (or unit partial reference images for subpixel estimation) are positions that are varied in the up/down direction (i.e., parallel to the Y-axis) from the target point (or the corresponding point). However, the extraction positions are not limited to being above/below, and may also be arbitrary peripheral positions around the target point (or the corresponding point), and they may also include the target point (or the corresponding point).

Unit partial target images for subpixel estimation (sub-unit partial target images) and unit partial reference images for subpixel estimation (sub-unit partial reference images) thus extracted are outputted to image concatenating section 402. With respect to unit partial target image sequences for subpixel estimation and unit partial reference images for subpixel estimation, it is assumed that the constituent data are arranged in ascending order of X-coordinate value.

Image concatenating section 402 accepts as input the plurality of unit partial target images for subpixel estimation and the plurality of unit partial reference images for subpixel estimation outputted from image extraction section 401. Image concatenating section 402 then forms a one-dimensional data sequence (hereinafter referred to as a "concatenated target image") in which the plurality of unit partial target images for subpixel estimation are concatenated in series. Similarly, image concatenating section 402 forms a one-dimensional data sequence (hereinafter referred to as a "concatenated reference image") in which the plurality of unit partial reference images for subpixel estimation are concatenated in series.

Filtering section 403 computes inverted phase filter coefficients by reversing the order of the pixel values of the concatenated target image formed at image concatenating section 402. The order of the pixel values is reversed in the front/rear direction. Using the computed inverted phase filter coefficients, filtering section 403 performs a filtering process on the concatenated reference image. Filtering section 403 then outputs the result of the filtering process (hereinafter referred to as "filtering result") to peak position detection section 104. Regarding details of the filtering process, a description is provided hereinbelow.

Returning to FIG. 1, with respect to the filtering result received from filter section 103, peak position detection section 104 detects a positional relationship at which the correlation between the concatenated target image and the concatenated reference image is maximized. Based on the obtained positional relationship, peak position detection section 104 computes the disparity (shift) between unit partial target images for subpixel estimation and the subpixel-level corresponding point in unit partial reference images for subpixel estimation corresponding to the target point.

Specifically, by detecting the position of a peak in the filtering result, peak position detection section 104 computes the above-mentioned shift. The above-mentioned peak in the filtering result refers to the position at which the filtering result reaches a maximum. By adding this subpixel-level shift and the pixel-level shift computed at image matching section 102 (i.e., shift n mentioned above), an accurate shift between the target image and the reference image is computed.

Stereo image processing apparatus 100 includes, for example, a CPU, and a storage medium (e.g., RAM, and/or the like). In this case, the various functional sections mentioned above are realized by having the CPU execute a control program.

[Operation of Stereo Image Processing Apparatus 100]

An operation of stereo image processing apparatus 100 thus configured is described below. The descriptions below assume that the X-axis represents the horizontal direction in the image, that the Y-axis represents the vertical direction in the image, and that one coordinate point represents one pixel. Furthermore, for purposes of convenience, it is assumed that the direction of the epipolar line (the base line direction) is parallel to the X-axis across the images.

Figure 3:
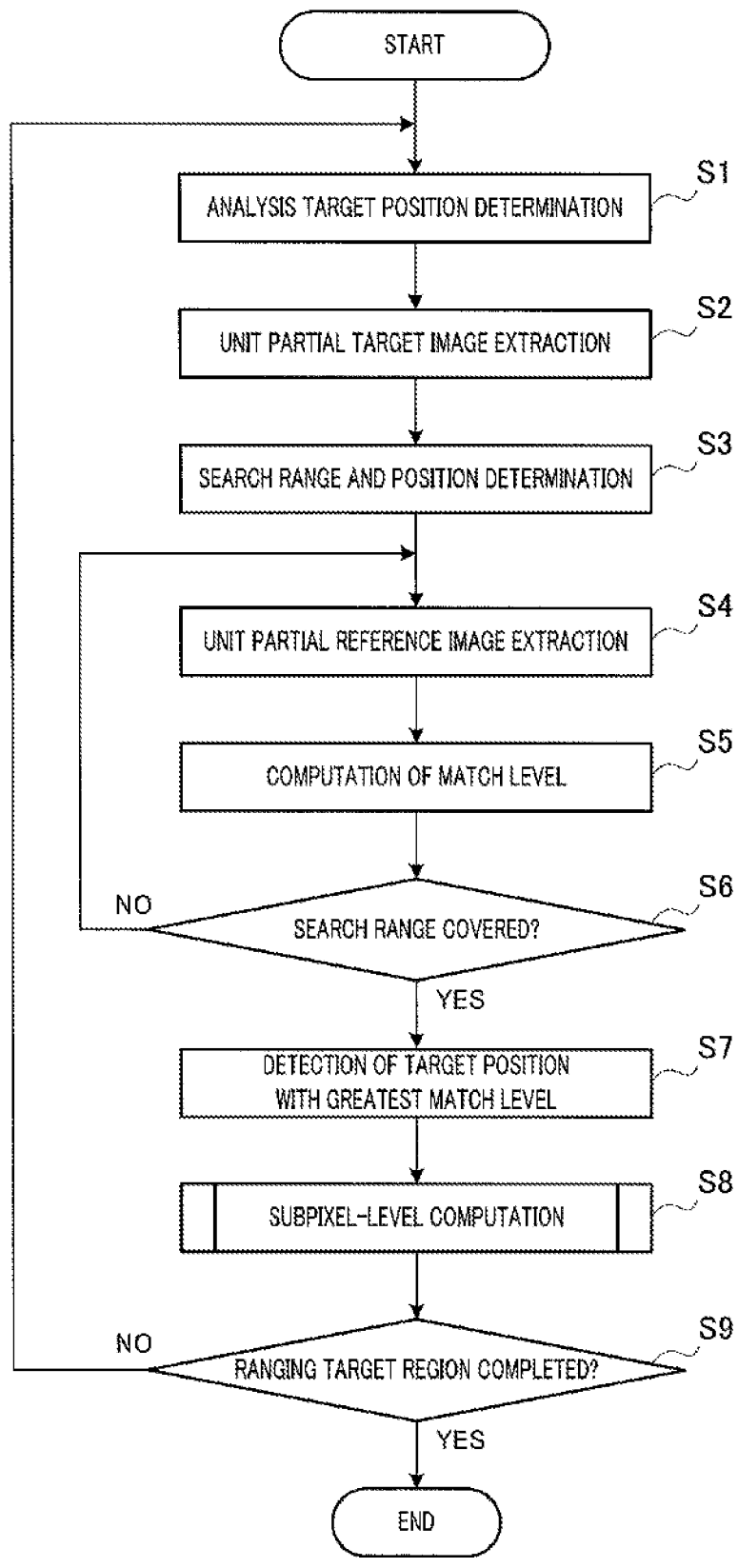
FIG. 3 is a flowchart illustrating an operation of a stereo image processing apparatus.

FIG. 3 is a flowchart illustrating an operation of stereo image processing apparatus 100. What follows is a description of a process regarding a given target point in the target image. However, stereo image processing apparatus 100 sequentially moves the target point across the entire target image, and performs the operations of steps S1 through S9 below for all pixels within a ranging target region.

<Analysis Target Position Determination Process> in step S1, image matching section 102 determines the position of the target point that is to be targeted for analysis in a ranging target region (hereinafter referred to as the "analysis target position").

<Unit Partial Target Image Extraction Process>

In step S2, image matching section 102 extracts a unit partial target image from the target image received from stereo image acquisition section 101. The unit partial target image is an image of a partial region (i.e., an image range) based around the analysis target position (i.e., the target point) determined in step S1. The size of the unit partial target image is measured in pixels. In other words, the unit partial target image is an image including a plurality of pixel rows times a plurality of pixel columns.

<Search Range and Search Start Position Determination Process>

Based on the analysis target position determined in step S2, image matching section 102 determines a search range and a search start position in the reference image in step S3. The disparity between stereo images is computed based on the base line, which is the inter-camera distance, the focal length of the lenses, and the distance from the stereo camera to the object of interest. Accordingly, the search range is determined based on the distance from the stereo camera to the object being ranged. An object that is at infinity from the stereo camera appears at the same position in the target image and the reference image. Accordingly, the same coordinates as those of the target point in the target image may be set for the search start position in the reference image.

<Unit Partial Reference Image Extraction Process>

In step S4, image matching section 102 determines an extraction target position, and extracts from the reference image a unit partial reference image of the same size as the unit partial target image. Image matching section 102 adopts the search start position determined in step S3 as, for example, the initial extraction target position, and subsequently shifts the extraction target position.

<Match Level Computation Process>

Image matching section 102 computes the level of match between the unit partial target image and the unit partial reference image in step S5. For this match level, an SAD value, which represents intensity difference, or intensity similarity may be used, for example.

<Search Range End Determination Process>

In step S6, image matching section 102 performs an end determination process for the process involving the search range. Specifically, image matching section 102 determines whether or not the extraction target position has been moved to cover the entire search range. If it is determined at this point that the search range has not been completed (step S6: No), image matching section 102 returns to step S4. As a result, image matching section 102 moves the extraction target position within the search range so as to displace the unit partial reference image extraction region of step S4. Thus, the processes of steps S4 through S6 are repeated until the search range is fully covered (step S6: Yes).

<Position with Greatest Match Level>

Based on the plurality of match levels obtained through the processes of steps S4 to S6, image matching section 102 identifies in step S7 the position of the unit partial reference image that results in the greatest level of match. If intensity difference is used for the match level, image matching section 102 identifies the unit partial reference image for which the intensity difference reaches a local or global minimum.

The processes of step S2 through step S7 will now be described more specifically with reference to FIG. 4.

Figure 4:
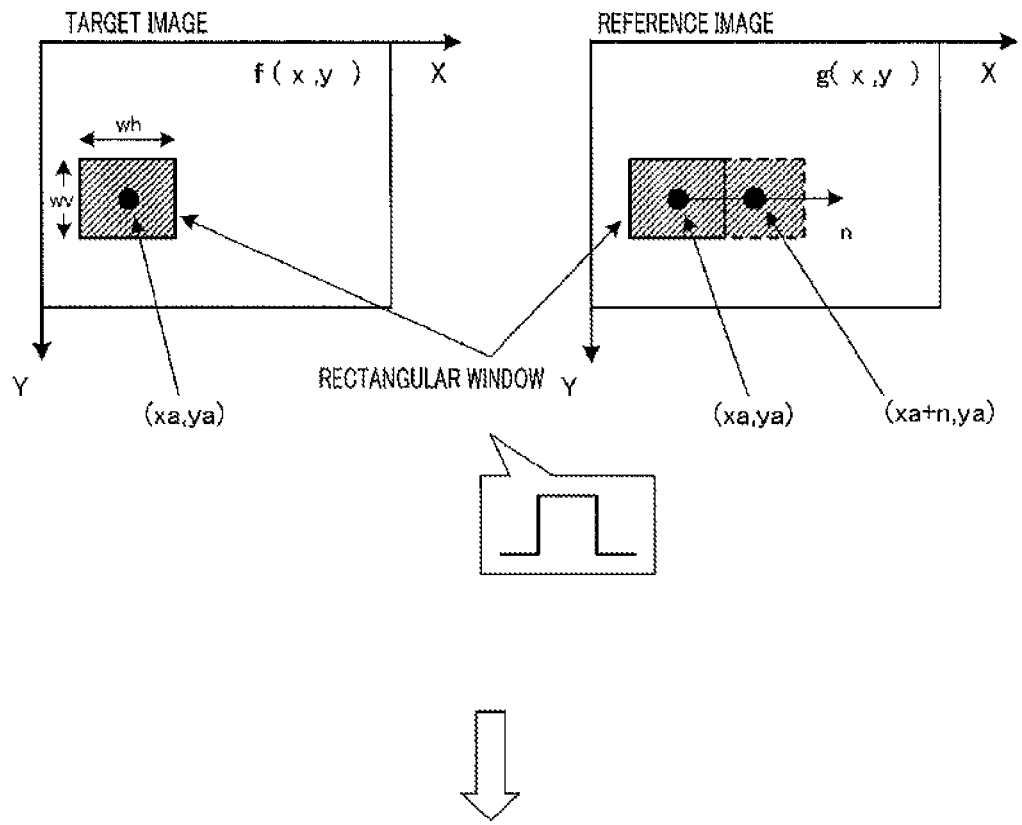
FIG. 4 is a diagram illustrating a process of an image matching section.

As shown in FIG. 4, in step S2 mentioned above, image matching section 102 extracts as a unit partial target image a partial image centered around analysis target position (target point) (xa, ya). For this extraction of the unit partial target image, a rectangular window of a predetermined size (vertical size: wv pixels, horizontal size: wh pixels) is used. The description below assumes that the center of the rectangular window as defined by a window function is aligned with the analysis target position. However, it need not strictly be the center, and it would suffice to have the analysis target position be near the center of the rectangular window.

Next, based on the analysis target position determined in step S1, image matching section 102 determines the search range and the search start position in the reference image in step S3 mentioned above. For the search start position (i.e., the initial coordinates for extracting a unit partial reference image in the reference image), the same coordinates as the analysis target position (i.e., xa, ya) in the target image may be used, for example. Next, as shown in FIG. 4, while sequentially shifting the extraction target position, image matching section 102 extracts in step S4, from the reference image and as unit partial reference images, partial images centered around the search start position. For the case at hand, the extraction target position is shifted by one pixel at a time. For this extraction of the unit partial reference images, the same rectangular window as that used for the extraction of the unit partial target image is used. For the initial coordinates of the extraction target position in the reference image, the same coordinates as the analysis target position (i.e., xa, ya) in the target image are used.

Image matching section 102 computes the level of match between the unit partial target image and each of the unit partial reference images in step S5 mentioned above. For this match level, an SAD value, which represents intensity difference, may be used, for example. This SAD value is computed through equation 1 below.

[1]

$$SAD(n) = \sum_{j=yo-wv/2}^{yo+wv/2} \sum_{i=xa-wh/2}^{xa+wh/2} |f(x+i, y+j) - g(x+i+n, y+j)| \quad \text{(Equation 1)}$$

Then, as shown in FIG. 4, if, in step S6 mentioned above, it is determined that the search range has not been fully covered, image matching section 102 shifts the extraction position, returns to step S4, and extracts a new unit partial reference image from the reference image. For the case at hand, the extraction position is shifted by one pixel at a time. With respect to FIG. 4, the extraction position is shifted in the X-axis direction from coordinates (xa, ya) in the reference image.

Thus, image matching section 102 computes the respective SAD values of the plurality of unit partial reference images with respect to one unit partial target image. Based on the plurality of match levels obtained through the process of step S5, image matching section 102 identifies in step S7 the unit partial reference image that results in the greatest level of match. Specifically, image matching section 102 identifies the unit partial reference image that corresponds to, of the plurality of SAD values, the smallest SAD value, for example. Assuming that the coordinates of the extraction target position for the thus identified unit partial reference image are (xa+n, ya), then n represents a pixel-level shift.

Image matching section 102 then takes the extraction target position at which the SAD value is smallest to be the pixel-level corresponding point for the analysis target position (i.e., the target point). Although SAD values are used above as indices of match level, the present invention is by no means limited as such. They may be replaced with anything so long as it lends to being used as an index of match level. By way of example, sums of squared differences (SSDs) may be used as indices of match level. This concludes this specific description of the processes of steps S2 through S7.

<Subpixel-Level Computation Process>

In step S8 in FIG. 3, based on the pixel-level corresponding point obtained in step S7 and the target image and reference image received from stereo image acquisition section 101, filter section 103 and peak position detection section 104 perform a subpixel-level computation process.

Figure 5:
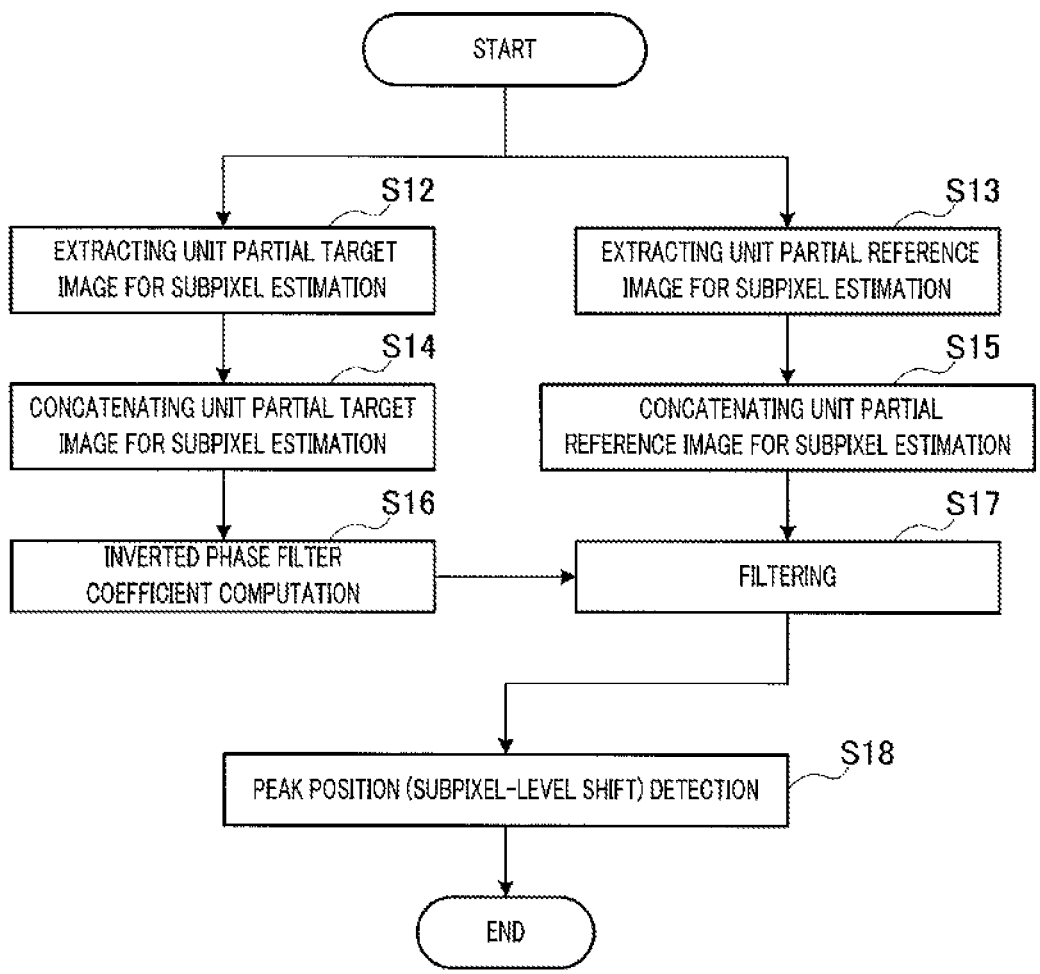
FIG. 5 is a flowchart showing details of a subpixel-level computation process.

FIG. 5 is a flowchart showing details of a subpixel-level computation process. FIG. 6 is a diagram illustrating a concept of a subpixel-level computation process.

(Extraction Process of Unit Partial Target Image for Subpixel Estimation)

In step S12, image extraction section 401 of filter section 103 extracts a plurality of unit partial target images for subpixel estimation from the unit partial target image. Specifically, image extraction section 401 extracts, from the unit partial target image, M many N-part unit partial target images (hereinafter referred to as "unit partial target images for subpixel estimation") obtained by dividing the unit partial target image into N parts (where N is a natural number equal to or greater than 2, and is a natural number equal to or greater than 2 but equal to or less than N).

The size of a unit partial target image for subpixel estimation is measured in pixels. The plurality of unit partial target images for subpixel estimation are extracted at positions displaced from the target point in the up/down direction. Furthermore, the plurality of unit partial target images for subpixel estimation are extracted in the direction of the X-axis, which is parallel to the epipolar line. In other words, unit partial target images for subpixel estimation are N-part unit partial target images obtained by dividing the unit partial target image into N parts in the direction of the Y-axis.

The extraction positions for unit partial target images for subpixel estimation are not limited to being above/below, and may also be arbitrary peripheral positions around the target point (or the corresponding point), and they may also include the target point (or the corresponding point).

The reason image extraction section 401 extracts at positions displaced from the target point in the up/down direction is because the object to be ranged is vertically elongate, as in pedestrians. By way of example, if the object of interest is so shaped as to be tilted at an angle, it is preferable that the plurality of unit partial target images for subpixel estimation be extracted at positions displaced in a slanted direction. In other words, it is preferable that the plurality of unit partial target images for subpixel estimation be extracted with respect to the image region in which objects at the same distance from the stereo camera are captured. In addition, it is preferable that the size of unit partial target images for subpixel estimation be designed with a value suited to the size of the object of interest in the image region.

A window function is used for the extraction of unit partial target images for subpixel estimation. For this window function, window function w(m) of the Hann window as expressed by equation 2 may be used, for example.

[2]
$$w(m) = \frac{1}{2}\left\{\cos\left(\pi \frac{m}{K-J}\right) + 1\right\}$$ (Equation 2)

Although the description below is with regard to a case where a window function of the Hann window is used, the present invention is by no means limited as such. For the window function, it is also possible to use the Hamming window, the Blackman window, the Kaiser window, and/or the like. This is because the window function is selected in accordance with which of the properties of unit partial target images for subpixel estimation (e.g., frequency power characteristics, phase characteristics, extraction edge continuity) is to be prioritized.

For an image extraction process for estimating disparity at the subpixel level, it is important that the extracted images not contain noise. This is to accurately determine the subpixel-level shift. On the other hand, since the image extraction process at image matching section 102 is performed on, for example, a pixel-level, reducing the number of computations is given more weight than accuracy. Accordingly, for the first window function used at image matching section 102, a window function that just extracts image data is used. By contrast, for the second window function used in the extraction process for unit partial target images for subpixel estimation, it is important that there be little noise. Thus, it is preferable that, as compared to the first window function, the second window function be a function whose changes at both ends of the window are continuous (i.e., a function whose first and last values of each cycle are zero).

By using such a second window function, continuity ensured for the unit partial target image signal for subpixel estimation, thereby making it possible to reduce the noise component included in the later-discussed inverted phase filter characteristics caused by extraction. Comparing the first window function and the second window function with regard to frequency characteristics, the first window function has a narrower main-lobe, and side-lobes with greater amplitudes than the second function.

With respect to FIG. 6, for the second window function, w(m), the Hann window is used, where the vertical axis and the horizontal axis are one pixel and "K-J" pixels in size, respectively. Furthermore, m is an integer equal to or greater than J but equal to or less than K. The second window function, w(m), is set with target point (xa, ya) at its center. Thus, an image whose vertical axis size is one pixel, whose horizontal axis size is "K-J" pixels, and which is centered around target point (xa, ya), is extracted as a unit partial target image for subpixel estimation. f'(m) represents the intensity values of the unit partial target image for subpixel estimation. Similarly, using second function w(m), which is set with target point (xa, ya+1) at its center, an image whose vertical axis size is one pixel, whose horizontal axis size is "K-J" pixels, and which is centered around target point (xa, ya+1), is extracted. Although the example above is one where two unit partial target images for subpixel estimation are extracted, it need not be two, and extraction may be carried out in a similar fashion in cases involving three or more.

(Extraction Process of Unit Partial Reference Image for Subpixel Estimation)

From the unit partial reference image with the largest level of match with the unit partial target image as detected in step S7, image extraction section 401 extracts, in step S13, M many N-part unit partial reference images (i.e., unit partial reference images for subpixel estimation) obtained by dividing that unit partial reference image into N parts. In this case, N is a natural number equal to or larger than 2, and M is a natural number equal to or larger than 2 but equal to or less than N. The same second window function as that for unit partial target images for subpixel estimation is also used in the unit partial reference image for subpixel estimation extraction process.

However, the second window function is set with respect to corresponding point (xa+n, ya). Thus, an image whose vertical axis size is one pixel, whose horizontal axis size is "K-J"

pixels, and which is centered around corresponding point (xa+n, ya), is extracted as a unit partial reference image for subpixel estimation.

With respect to FIG. 6, g'(m) represents the intensity values of the unit partial reference image for subpixel estimation. Similarly, using second function w(m), which is set with corresponding point (xa, ya+1) at its center, an image whose vertical axis size is one pixel, whose horizontal axis size is "K-J" pixels, and which is centered around corresponding point (xa, ya+1), is extracted. Although the example above is one where two unit partial reference images for subpixel estimation are extracted, it need not be two, and extraction may be carried out in a similar fashion in cases involving three or more.

In the description above, second window function w(m) whose vertical axis and horizontal axis are one pixel and "K-J" pixels in size, respectively, is used. However, this size is provided merely as an example, and is by no means limiting. By way of example, in cases where the vertical size is made to be three pixels, the process mentioned above may be performed for each pixel, and the obtained results may then be averaged.

Furthermore, if, by way of example, the vertical size spans a plurality of pixels, the process mentioned above may be performed for each vertical pixel, and the results for each set of pixels covered by the vertical size may be weighted and averaged. The weighting coefficients used in this case may be determined with a window function, such as two-dimensional POC. When the vertical size of unit partial target images for subpixel estimation and unit partial reference images for subpixel estimation is two or more pixels, image extraction section 401 performs averaging as mentioned above. Image extraction section 401 then converts unit partial target images for subpixel estimation and unit partial reference images for subpixel estimation into respective one-dimensional data sequences.

(Concatenating Process of Unit Partial Target Images for Subpixel Estimation)

In step S14, image concatenating section 402 links, in series, the data sequences of the M many unit partial target images for subpixel estimation (or, if they have been converted into one-dimensional data sequences through averaging and/or the like, the data sequences of unit partial target images for subpixel estimation as converted). Image concatenating section 402 thus forms a one-dimensional data sequence (hereinafter referred to as a "concatenated target image data sequence").

(Concatenating Process of Unit Partial Reference Images for Subpixel Estimation Concatenating Process)

In step S15, image concatenating section 402 concatenates, in series, the data sequences of the M many unit partial reference images for subpixel estimation (or, if they have been converted into one-dimensional data sequences through averaging and/or the like, the data sequences of unit partial reference images for subpixel estimation as converted). Image concatenating section 402 thus forms a one-dimensional data sequence (hereinafter referred to as a "concatenated reference image data sequence").

Figure 7A:
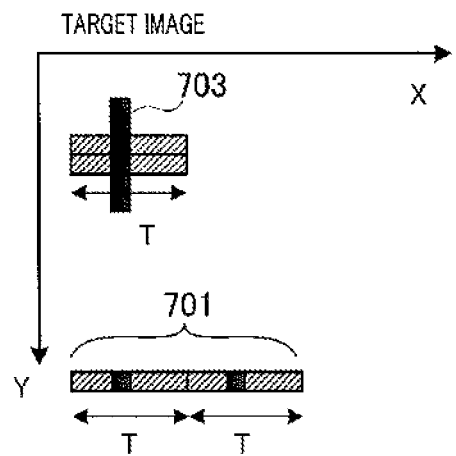
FIGS. 7A through 7D are diagrams illustrating a concept of a process of an image concatenating section.
Figure 7C:
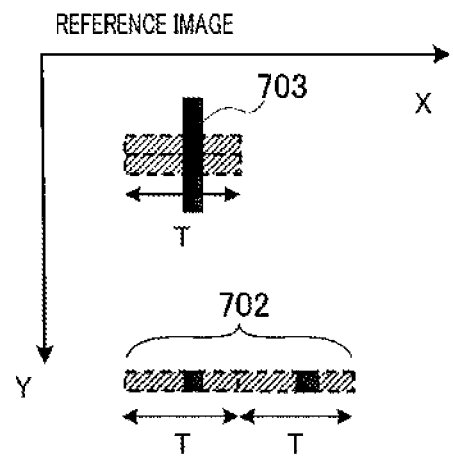
Figure 7B:
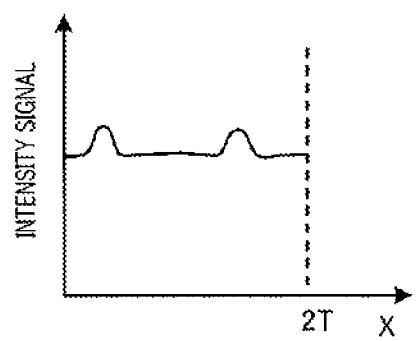
Figure 7D:
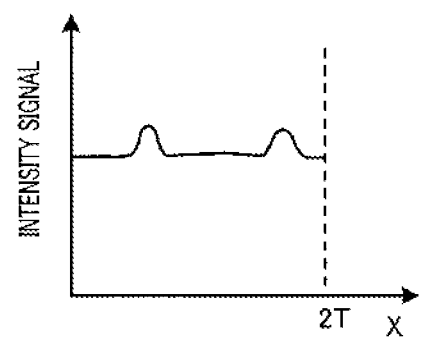

FIGS. 7A through 7D are diagrams illustrating a concept of a process of image concatenating section 402. FIG. 7A shows how unit partial target images for subpixel estimation are extracted from a target image, and it shows image 701 in which two extracted unit partial target images for subpixel estimation are concatenated. FIG. 7B shows the intensity signal of the data sequence of concatenated image 701 (i.e., of the concatenated target image data sequence) in FIG. 7A. FIG. 7C shows how unit partial reference images for subpixel estimation are extracted from a reference image, and it shows image 702 in which two extracted unit partial reference images for subpixel estimation are concatenated. FIG. 7D shows the intensity signal of the data sequence of concatenated image 702 (i.e., of the concatenated reference image data sequence) in FIG. 7C.

In FIGS. 7A through 7D, a case is presented where, in both the unit partial target image and the unit partial reference image, there exists an image region where the intensity value changes frequently due to vertical line 703 (e.g., corresponding to a pedestrian as an object to be ranged) (i.e., there exists a high-frequency component in the intensity signal). It can be seen that in concatenated unit partial target image 701 for subpixel estimation and concatenated unit partial reference image 702 for subpixel estimation, a plurality of intensity value changes corresponding to vertical line 703 are observed.

Stereo image processing apparatus 100 is thus able to utilize a plurality of simulated intensity value changes set apart by roughly the window size (a low frequency component with a period corresponding to the window size), as a result of which it is able to improve disparity computation accuracy.

Before concatenating the M many unit partial target images for subpixel estimation (or unit partial reference images for subpixel estimation) in series, image concatenating section 402 may perform an image data sequence end part smoothing process for smoothly concatenating the end parts of the image data sequences. However, this is unnecessary if a window function that smoothly extracts image data sequence end parts (e.g., the Hann window, and/or the like) is used in extracting unit partial target images for subpixel estimation (or unit partial reference images for subpixel estimation).

(Inverted Phase Filter Coefficient Computation Process)

In step S16, filtering section 403 computes inverted phase filter coefficients based on the concatenated target image data sequence. Specifically, filter section 103 reverses the order of the data sequence by switching the positions of the corresponding pixels in the concatenated target image data sequence in the front/rear direction.

(Filtering Process)

In step S17, filtering section 403 filters the concatenated reference image data sequence using the inverted phase filter coefficients computed in step S16, and outputs the filtering result to peak position detection section 104.

Figure 15A:
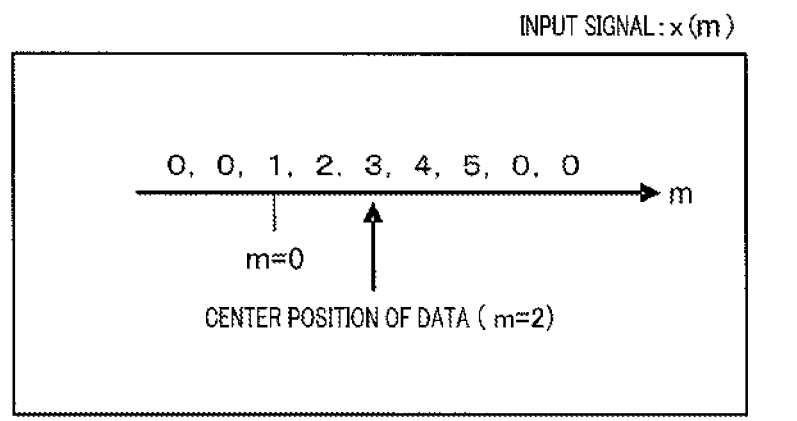
FIGS. 15A through 15C are schematic representations illustrating a concept of filtering based on inverted phase filter coefficients.
Figure 15B:
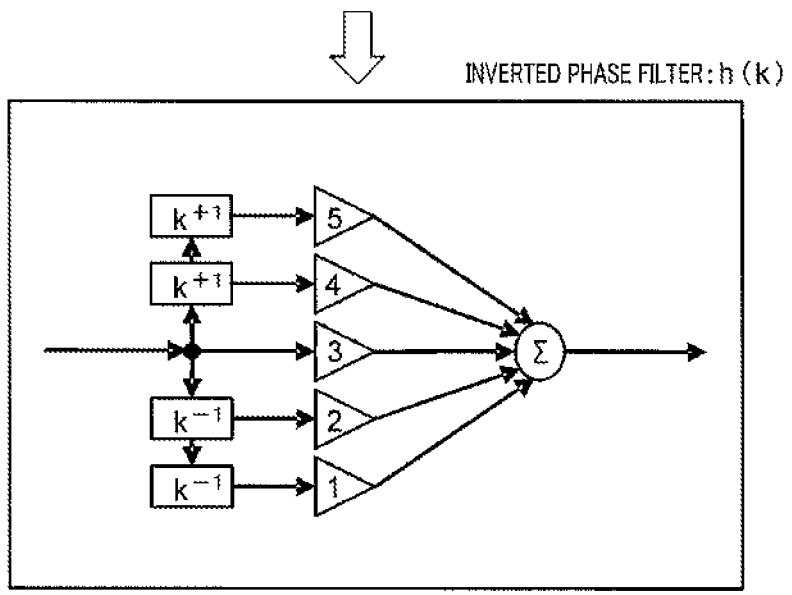
Figure 15C:
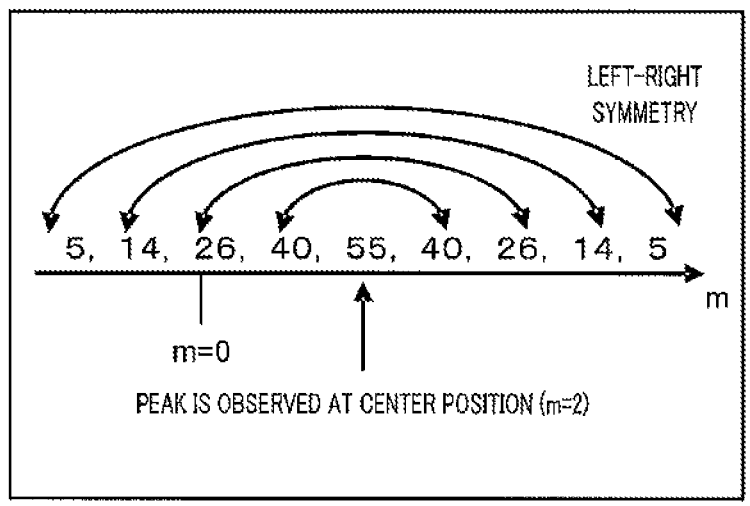

A concept of filtering will now be described. FIGS. 15A through 15C are schematic representations illustrating a concept of filtering based on inverted phase filter coefficients. With respect to FIGS. 15A through 15C, it is assumed that length (N) of window function w(m) is five pixels. It is also assumed that the concatenated target image data is "1, 2, 3, 4, 5", and that concatenated reference image data x(m) is also "1, 2, 3, 4, 5". Furthermore, it is assumed that the pixel values used for filtering are intensity values.

When the concatenated target image data is "1, 2, 3, 4, 5", filter section 103 computes "5, 4, 3, 2, 1" as inverted phase filter coefficients h(k).

Using inverted phase filter coefficients h(k), filter section 103 performs a filtering process on the concatenated reference image data as shown in FIG. 15B. More specifically, this filtering process is performed as follows. Where the coordinates of a given constituent signal in the concatenated reference image data is denoted by k, filter section 103 multiplies the signal sequence by inverted phase filter coefficients h(k), the coordinates of the constituent signals of the signal sequence being "k−2, k−1, k, k+1, k+2". Thus, filter section 103 performs a filtering process on the signal sequence, and computes the sum of the multiplication results as filtering result z(m), where m assumes an integer value of 1 to 5.

Taking into consideration, outside both ends of the concatenated reference image data, virtual coordinate points whose intensities are 0, concatenated reference image data x(m) becomes "0, 0, 1, 2, 3, 4, 5, 0, 0" as shown in FIG. 15A. When m in FIG. 15A (m: 0-4) is taken to be the coordinate points or the concatenated reference image data (i.e., x(0)=1, x(1)=2, x(2)=3, x(3)=4, x(4)=5), the filtering process is performed as follows.

When m=0, filter section 103 filters intensity value signal sequence "0, 0, 1, 2, 3", which is centered around m=0, with inverted phase filter "5, 4, 3, 2, 1". Thus, z(0) is 26 (=0×1+ 0×2+1×3+2×4+3×5).

When m=1, filter section 103 filters intensity value signal sequence "0, 1, 2, 3, 4", which is centered around m=1, with inverted phase filter "5, 4, 3, 2, 1". Thus, z(1) is 40 (=0×1+ 1×2+2×3+3×4+4×5).

Likewise, Z(2) is 55, z(3) is 40, and z(4) is 26. Accordingly, filter section 103 obtains "26, 40, 55, 40, 26" as filtering results z(m).

Such filtering results are given by equation 3. In equation 3, f'(−k) in which the concatenated target image data is reversed is used as filter coefficients h(k) of the inverted phase filter. g'(m) represents the intensity values of the concatenated reference image data.

[3]

$$z(m) = \sum_{k=0}^{2(K-J)+1} \tilde{f}(-k) \times \tilde{g}(m-k) \quad \text{(Equation 3)}$$

As shown in FIG. 15C, filtering results z(m) obtained through the filtering process using the inverted phase filter is symmetrical (in FIG. 15, it has left-right symmetry about m=2), and has a characteristic where a peak exists near the center.

The inverted phase filter may be considered a sort of so-called FIR filter, and is characteristic in that it is a linear shift invariant system. A linear shift invariant system is a system where, when there is a shift in the input signal, the output signal is shifted by the same amount as the input signal.

For the specific example discussed above, a description has been provided with respect to an example case where there is no shift between the concatenated reference image data and the concatenated target image data. However, if there exists a small shift between the concatenated reference image data and the concatenated target image data, a shift of the same magnitude would occur in z(m), which represents the filtering results.

When determining disparity for objects of the same size in an actual space, disparity is smaller when the object is located far from the stereo camera than when it is located near the stereo camera, and pixel-level shift a is likewise smaller. Furthermore, the image region size of the object in question in the base line direction also becomes smaller.

Therefore, it is preferable that the tap length of the inverted phase filter be set in accordance with the magnitude of pixel-level shift n detected at image matching section 102. By way of example, if pixel-level shift n is small, the tap length of the inverted phase filter is set short in a corresponding manner. By adaptively varying the size of unit partial target images for subpixel estimation and unit partial reference images for subpixel estimation with respect to shift n, stereo image processing apparatus 100 is able to adaptively vary the tap length of the inverted phase filter as well.

This enables disparity computation that is commensurate with the size of the object of interest.

The filtering results are outputs of a linear shift invariant system. Accordingly, once lens distortion compensation errors, errors such as gain noise and/or the like caused by image sensors (e.g., CCDs), and errors in the computation accuracy of image extraction by applying a window are eliminated, the filtering results should theoretically represent the true shift. Therefore, with respect to the output of the inverted phase filter, which is discretized on a pixel level, by interpolating the values between pixels according to the sampling theorem, it is possible to determine the true subpixel-level peak position. This concludes this description of a concept of filtering.

Figure 16:
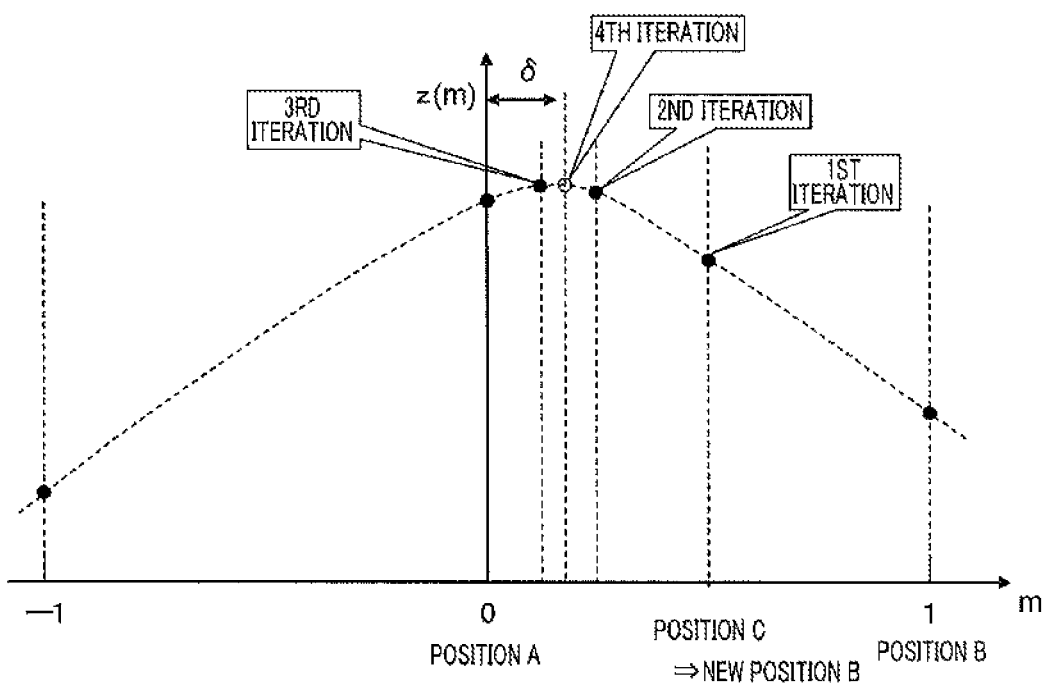
FIG. 16 is a schematic representation generally showing an example of a peak position detection process using the sine function.

Next, a peak position detection process (step S18) for the filtering results is described generally. FIG. 16 is a schematic representation generally showing an example of a peak position detection process using the sine function.

The sine function is a function defined by $\sin(\pi x)/\pi x$, and is used to turn discretized sampling data back into the original continuous data. It is proven by the sampling theorem that by performing a convolution operation of the sampled discrete data and the sine function, it is possible to completely reconstruct the original continuous data.

Accordingly, peak position detection section 104 performs a convolution operation on the discretized filtering results with the sine function. Thus, peak position detection section 104 is able to interpolate the signal data with pixel-level intervals, and to derive the true peak position of filtering results z(m), where the signal data is theoretically interpolated at the subpixel level as well.

As shown in FIG. 16, peak position detection section 104 detects the peak position through a binary search, for example.

By way of example, peak position detection section 104 takes position m=0, at which the filtering results z(m) with pixel-level intervals become largest, to be position A (i.e., a binary search target point). Peak position detection section 104 compares z(+1) and z(−1), which are filtering results located one pixel to the right and left of maximum position A. Peak position detection section 104 takes the position with the larger value (in this case, m=1) to be position B (i.e., a binary search working point).

Based on the sampling theorem, peak position detection section 104 then computes the value of position C, which is the midpoint between binary search target point A and binary search working point B, through equation 4 below, for example. T denotes the sampling interval (pixel pitch).

[4]

$$f(m) = \sum_{n=-\infty}^{\infty} f(nT) \frac{\sin\left(\pi\left(\frac{m}{T}-n\right)\right)}{\pi\left(\frac{m}{T}-n\right)} \quad \text{(Equation 4)}$$

Peak position detection section 104 then repeats the process above with position C as the new binary search target point.

The number of iterations for this process may be set in accordance with the required accuracy. Specifically, if the required subpixel accuracy is ½ of a pixel, then peak position detection section 104 may perform the above-mentioned process once. Peak position detection section 104 may determine the number of iterations in accordance with the required subpixel accuracy, as in twice if the required subpixel accuracy is ¼ of a pixel, or three times if the required subpixel accuracy is ⅛ of a pixel.

Peak position detection section 104 treats the ultimately obtained midpoint as detected peak position δ.

The description above involves a method of detecting a peak position using the sine function and a binary search. However, the present invention is by no means limited thereto. By way of example, peak position detection section 104 may also seek the peak position through a combination of the sine function and a gradient method. Specifically, once the discretized filtering results have undergone a convolution operation with the sine function and the signal data with pixel-level intervals has been interpolated, peak position detection section 104 may use various maximum value detection methods.

Alternatively, peak position detection section 104 may also detect the peak position using quadratic curve approximation. This allows peak position detection section 104 to reduce computation amounts for peak position detection. In this case, peak position detection section 104 fits a quadratic curve to the discretized filtering results, and detects as a peak position the position of a local maximum of that quadratic curve. Thus, peak position detection section 104 is able to determine a peak position with an accuracy that is finer than the discretization interval.

Figure 17:
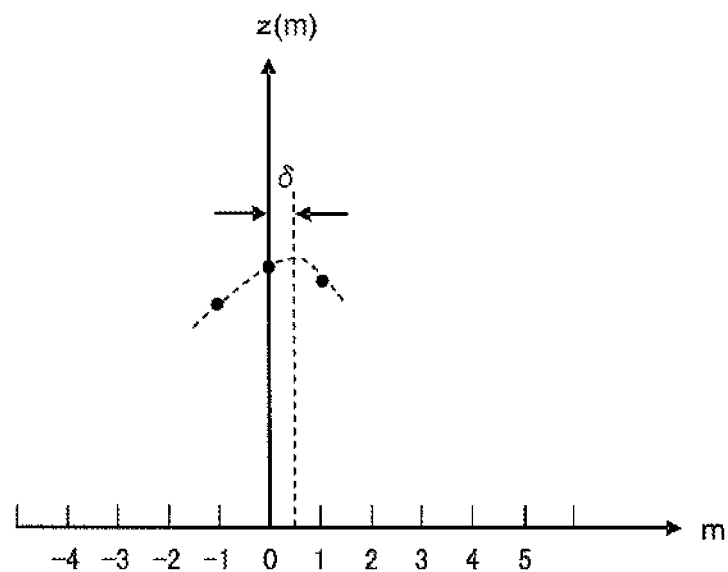
FIG. 17 is a schematic representation generally showing an example of a peak position detection process that uses quadratic curve approximation.

FIG. 17 is a schematic representation generally showing an example of a peak position detection process that uses quadratic curve approximation.

As shown in FIG. 17, peak position detection section 104 first determines value z(0) at position m=0, where filtering results z(m) with pixel-level intervals become greatest. Peak position detection section 104 obtains z(+1) and z(−1), which are filtering results at positions m=+1, −1 located one pixel to the right and left of maximum position m=0. Peak position detection section 104 then finds a quadratic curve that passes through these three points, and further detects as peak position δ the position of the local maximum of that quadratic curve. Peak position δ mentioned above may be computed through equation 5 below, for example.

[5]
$$\delta = \frac{z(-1) - z(+1)}{2 \times \{z(-1) + z(+1) - 2 \times z(0)\}} \quad \text{(Equation 5)}$$

The disparity of the analysis target position with respect to the target image can be determined by adding pixel-level shift n and subpixel level shift δ'.

This concludes this general description of peak position detection processes for filtering results. Furthermore, this concludes this specific description of the processes of steps S16 through S18.

(Ranging Target Region Completion Determination Process)

In step S9, image matching section 102 performs a ranging target region completion determination process. Specifically, with respect to the target image as a whole, image matching section 102 determines whether or not there is an unprocessed region that has not yet undergone the processes of step S1 through step S8. If there is an unprocessed region (S9: No), image matching section 102 returns to step S1, shifts the analysis target position, and performs the processes of step S1 through step S8 for that unprocessed region. On the other hand, if there is no unprocessed region (S9: Yes), image matching section 102 terminates the flow of operations.

Thus, with the present embodiment, image extraction section 401 of stereo image processing apparatus 100 extracts M many divisional target images obtained by dividing a first partial region (in this case, the unit partial target image) within the target image into N parts (where N is a natural number equal to or greater than 2, and M is a natural number equal to or greater than 2 but equal to or less than N). Furthermore, image extraction section 401 extracts M many divisional reference images obtained by dividing a second partial region (in this case, the unit partial reference image) in the reference image corresponding to the first partial region into N parts. Image concatenating section 402 forms a first concatenated data sequence (in this case, the concatenated target image data sequence) by concatenating, in series, M many data sequences, where the data sequences are each formed of intensity values of a corresponding divisional target image. Furthermore, image concatenating section 402 forms a second concatenated data sequence (in this case, the concatenated reference image data sequence) by concatenating, in series, M many data sequences, where the data sequences are each formed of intensity values of a corresponding divisional reference image. Filtering section 403 then computes inverted phase filter coefficients by reversing the data order of the first concatenated data sequence, and performs filtering on the second concatenated data sequence using the inverted phase filter coefficients. Peak position detection section 104 computes shift n based on the peak position in the filtering results of filtering section 403.

By thus computing disparity based on a concatenated target image data sequence and a concatenated reference image data sequence, it is possible to simultaneously use a plurality of sets of information regarding intensity value changes with a narrow width. Furthermore, since there are a plurality of intensity value changes with a narrow width and set apart by roughly the window size, it is possible to use low-frequency components with a period corresponding to the window size in a simulated fashion, as a result of which it is possible to improve disparity computation accuracy.

Embodiment 2

With Embodiment 2, a low-frequency component suppression process is performed as a preprocess to the image extraction process.

Figure 8:
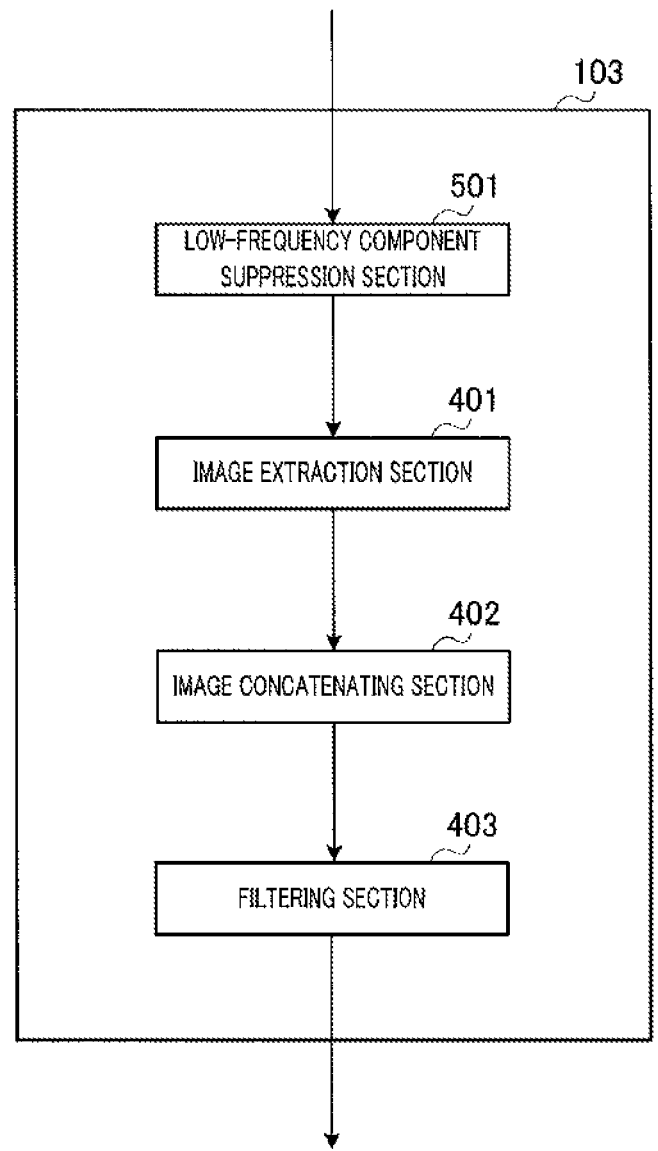
FIG. 8 is a block diagram showing a configuration of a filter section according to Embodiment 2 of the present invention.

FIG. 8 shows a configuration of filter section 103 according to Embodiment 2 of the present invention. With respect to FIG. 8, filter section 103 includes low-frequency component suppression section 501.

Low-frequency component suppression section 501 takes as input the target image and the reference image acquired at stereo image acquisition section 101, and relatively suppresses the amplitudes of the low-frequency components in the target image and the reference image. Since the amplitudes of the low-frequency components need only be suppressed relative to the amplitudes of the high-frequency components, low-frequency component suppression section 501 may also enhance the amplitudes of the high-frequency components.

Figure 9:
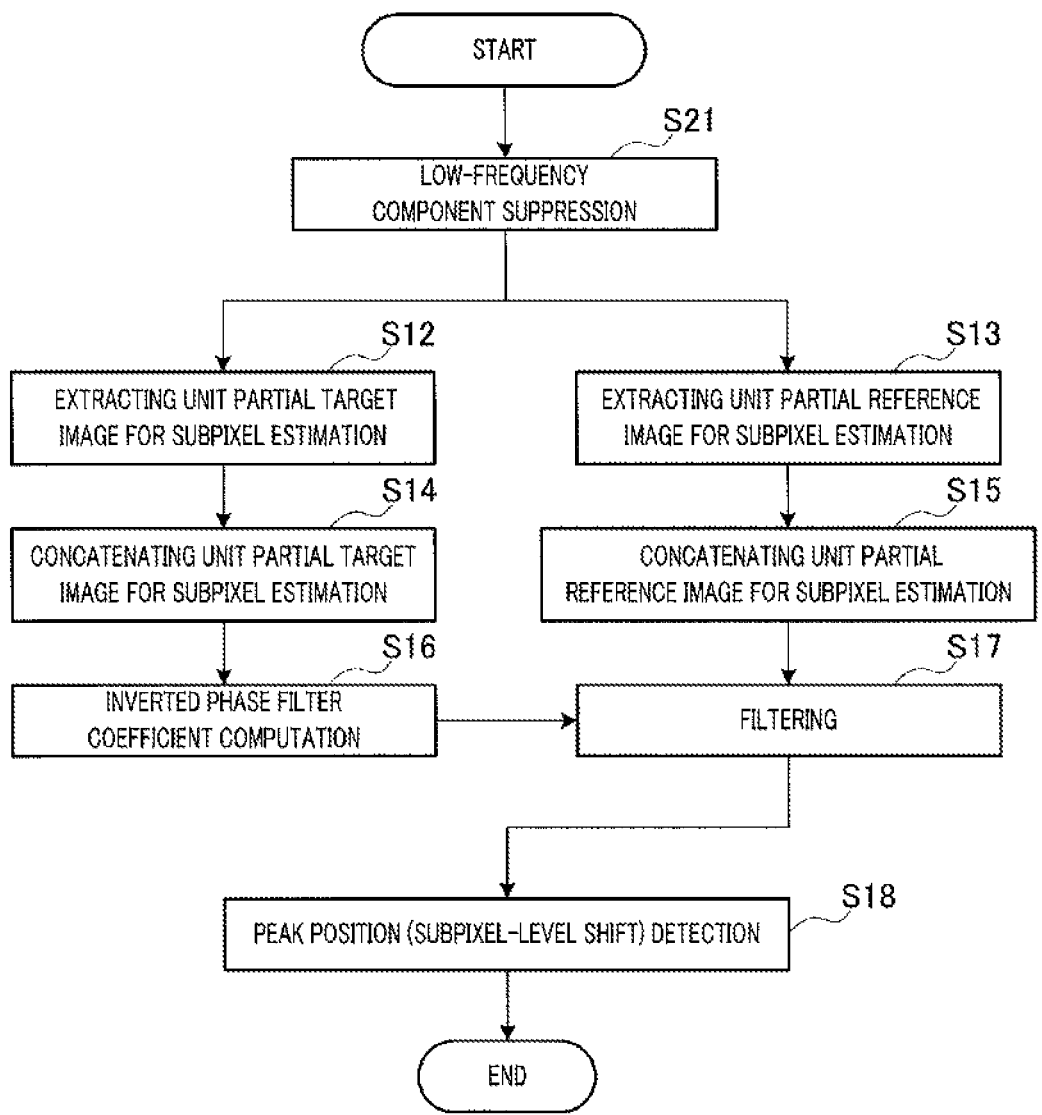
FIG. 9 is a flowchart showing details of a subpixel-level computation process.

FIG. 9 is a flowchart showing details of a subpixel-level computation process according to Embodiment 2.

(Low-Frequency Component Suppression Process)

In step S21, low-frequency component suppression section 501 relatively suppresses the low-frequency components of the unit partial target image and the unit partial reference image. Since the amplitudes of the low-frequency components need only be suppressed relative to the amplitudes of the high-frequency components, low-frequency component suppression section 501 may also enhance the amplitudes of the high-frequency components. For the amplitude enhancement process for high-frequency components, common processes may be used, and, for example, it may be realized by using a Laplacian of Gaussian (LOG) filter.

Figure 10C:
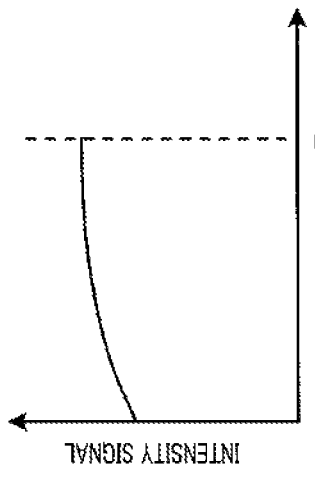
FIGS. 10A through 10D are diagrams illustrating a concept of a low-frequency component suppression process.
Figure 10D:
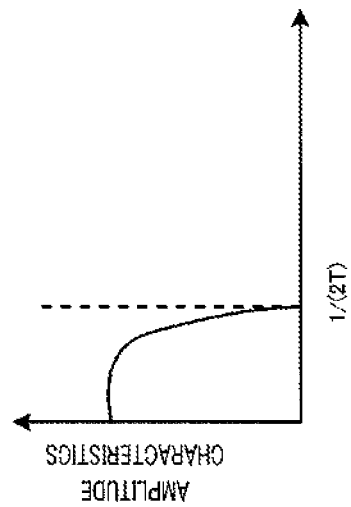
Figure 10A:
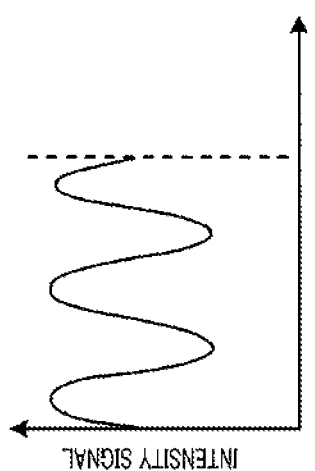
Figure 10B:
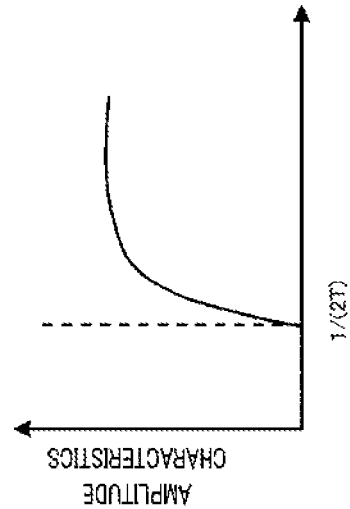

FIGS. 10A through 10D are diagrams illustrating a concept of a low-frequency component suppression process. FIGS. 10A and 10B represent a intensity signal and frequency characteristics of a high-frequency wave, respectively. FIGS. 10C and 10D represent a intensity signal and frequency characteristics of a low-frequency wave. T denotes the window length (K-J) in FIG. 6. A intensity signal that has a short period relative to extraction width T of the window function, as in FIG. 10A, is a intensity signal that has a frequency of or above 1/(2T) in spatial frequency, as in FIG. 10B. On the other hand, a intensity signal that has a long period relative to extraction width T of the window function, as in FIG. 10C, is a intensity signal that has a frequency lower than 1/(2T) in spatial frequency, as in FIG. 10D. In this low-frequency component suppression process, 1/(2T) is used as a determination criteria (i.e., a determination threshold) for determining whether a given signal is a high-frequency intensity signal subject to enhancement, or a low-frequency intensity signal subject to suppression.

A intensity signal that has a long period relative to extraction width T is a signal having a frequency that cannot be expressed with extraction width T. In other words, a intensity signal that has a long period relative to extraction width T does not lend to having even one cycle's worth of waveform expressed with extraction width T. Such a intensity signal degrades the accuracy of frequency-based matching (i.e., matching that focuses on the frequency components of a signal). Accordingly, it is preferable that the subsequent extraction process be performed after having suppressed low-frequency components as much as possible.

Thus, with the present embodiment, low-frequency component suppression section 501 of stereo image processing apparatus 100 suppresses, relative to the high-frequency components, the low-frequency components of the image signal corresponding to the first partial region and of the image signal corresponding to the second partial region. For the case at hand, the first partial region is a unit partial target region, and the second partial region is a unit partial reference image.

By so doing, it is possible to suppress low-frequency components, which cause the accuracy of frequency-based matching (i.e., matching that focuses on the frequency components of signals) to degrade, as a result of which it is possible to improve disparity computation accuracy.

The description above involves a case where low-frequency component suppression section 501 is applied to filter section 103 according to Embodiment 1. However, this is by no means limiting. By way of example, low-frequency component suppression section 501 may also be applied to a stereo image processing apparatus that does not include image concatenating section 402 (i.e., one that computes disparity based on one unit partial target image and one unit partial reference image corresponding thereto). With respect to a stereo image processing apparatus such as the following, which includes an image matching section and a filter section, a low-frequency component suppression section, which suppresses the low-frequency components in both the target image and the reference image, may be provided in the filter section. The image matching section computes a pixel-level shift between the target image and the reference image. The filter section computes inverted phase filter coefficients by reversing the data order of a data sequence including the intensity values within the target image, and performs filtering on the reference image using the inverted phase filter coefficients.

Embodiment 3

With Embodiment 3, before the image extraction process, it is determined, based on the amplitudes of the high-frequency components, whether or not processes following the image extraction process are to be executed.

Figure 11:
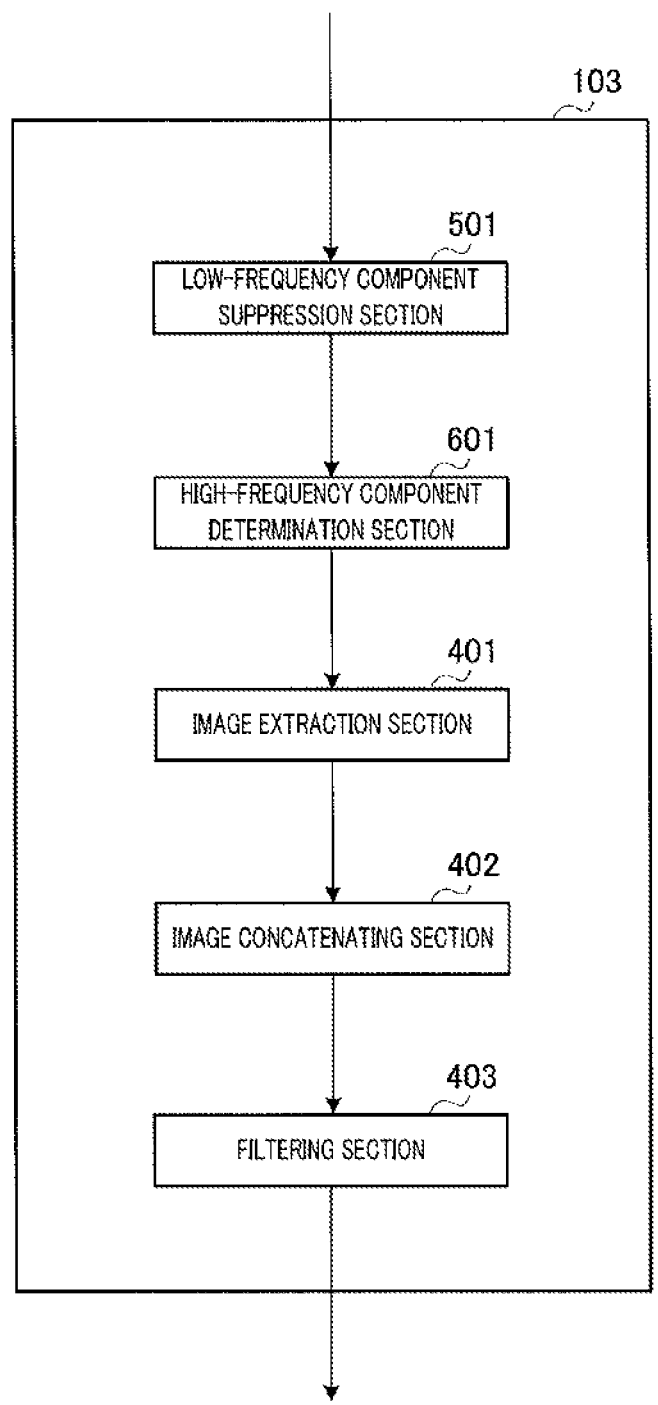
FIG. 11 is a block diagram showing a configuration of a filter section according to Embodiment 3 of the present invention.

FIG. 11 shows a configuration of filter section 103 according to Embodiment 3 of the present invention. With respect to FIG. 11, filter section 103 includes high-frequency component determination section 601.

High-frequency component determination section 601 receives as input the target image and the reference image, whose amplitudes of the low-frequency components have been relatively suppressed at low-frequency component suppression section 501, as well as the target point and shift n from image matching section 102. Based on the above, it determines whether or not subsequent processes are to be executed. Specifically, this determination is executed in accordance with how large the amplitude of the high-frequency component of the image data sequence at the target point of the target image is, and with how large the amplitude of the high-frequency component of the image data sequence at the corresponding point of the reference image is. The corresponding point of the reference image is, in other words, a point in the reference image that is shifted from the same coordinates as the target point by shift n. The subsequent processes mentioned above refer to the processes at image extraction section 401, image concatenating section 402, filtering section 403, and peak position detection section 104.

Figure 12:
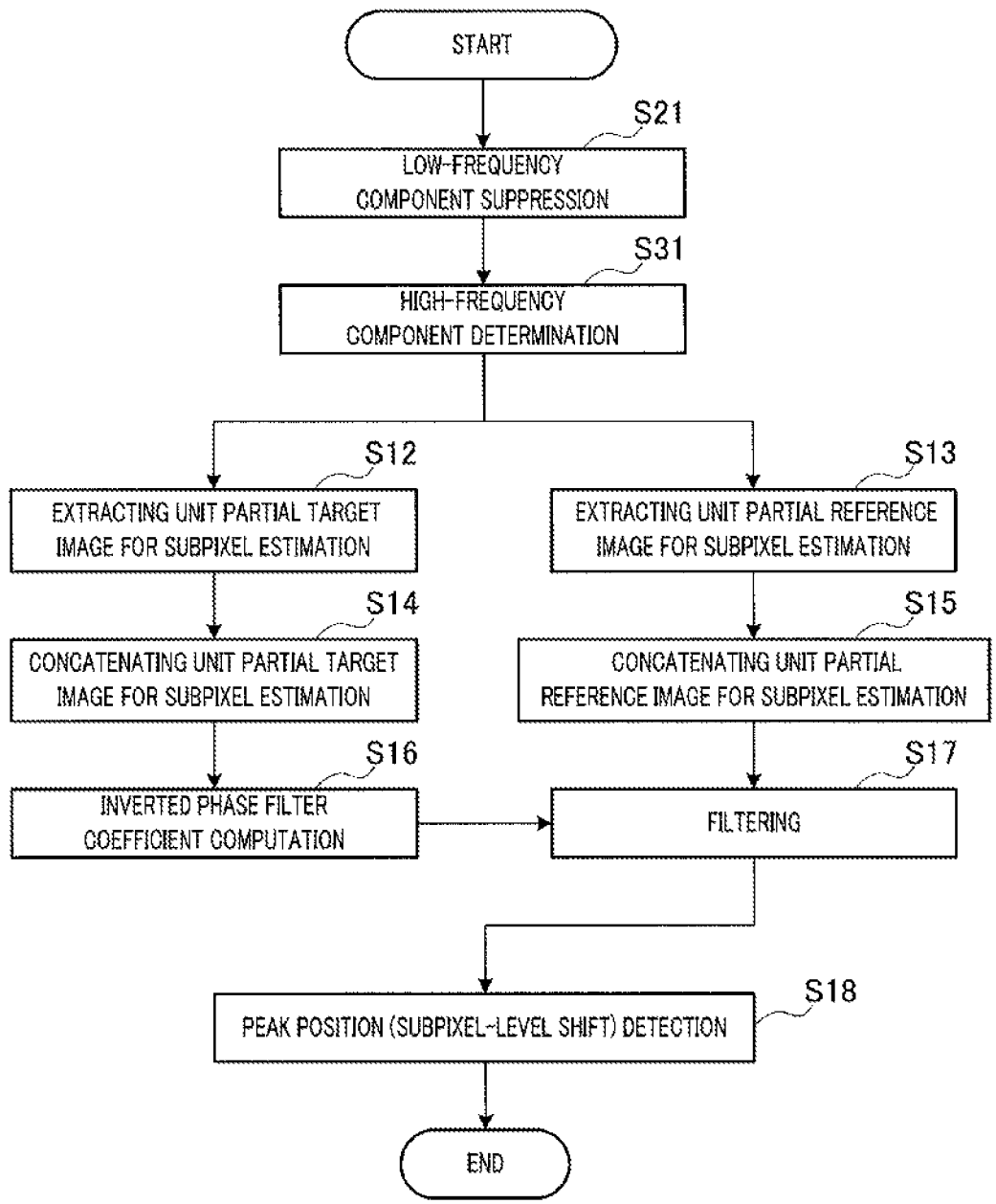
FIG. 12 is a flowchart showing details of a subpixel-level computation process.

FIG. 12 is a flowchart showing details of a subpixel-level computation process according to Embodiment 3.

(High-Frequency Component Determination Process)

In step S31, high-frequency component determination section 601 receives as input the target image and the reference image, whose amplitudes of the low-frequency components have been relatively suppressed at low-frequency component suppression section 501, as well as the target point and shift n from image matching section 102. Based on the above, high-frequency component determination section 601 determines whether or not subsequent processes are to be executed. Specifically, this determination is executed in accordance with how large the amplitude of the high-frequency component of the image data sequence at the target point of the target image is, and with how large the amplitude of the high-frequency component of the image data sequence at the corresponding point of the reference image is. The corresponding point of the reference image is, in other words, a point in the reference image that is shifted from the same coordinates as the target point by shift n. If both the amplitude of the high-frequency component of the image data sequence at the target point of the target image, as well as the amplitude of the high-frequency component of the image data sequence at the corresponding point of the reference image are equal to or greater than a predetermined threshold (i.e., if the amplitudes are determined to be large), the subsequent processes are executed. On the other hand, if they are less than the predetermined threshold, the subpixel-level computation process is terminated.

Figure 13A:
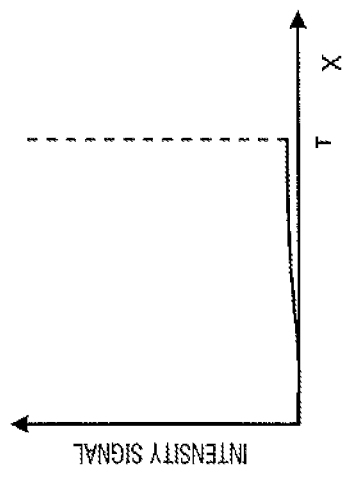
FIGS. 13A through 13D are diagrams illustrating a concept of a high-frequency component determination process.
Figure 13B:
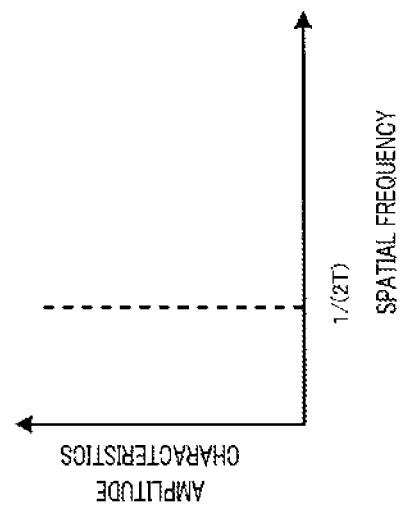
Figure 13C:
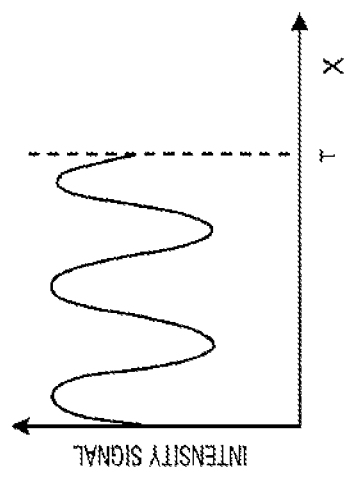
Figure 13D:
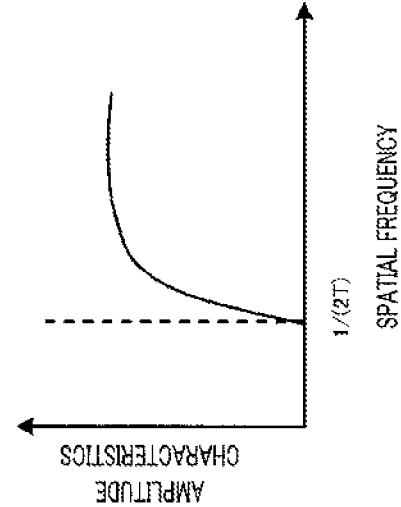

FIGS. 13A through 13D are diagrams illustrating a concept of a high-frequency component determination process. FIGS. 13A and 13B represent a intensity signal and frequency characteristics of a high-frequency wave after low-frequency component suppression, respectively. FIGS. 13C and 13D represent a intensity signal and frequency characteristics of a low-frequency wave after low-frequency component suppression, respectively. To determine the presence/absence of high-frequency component amplitudes, one may employ a frequency transform process (e.g., Fourier transform). Or, to reduce computation amounts, one may employ simple processes, such as computing the sum of absolute values of the rates of change in the intensity signal.

As mentioned above, for some low-frequency components, depending on their relationship with the extraction width of the window function, accurate matching cannot be achieved. Accordingly, a signal whose high-frequency components have small amplitudes is equivalent to a signal with zero disparity. In other words, for some signals whose high-frequency components have small amplitudes, accurate disparity computation is difficult. Accordingly, by terminating the subpixel-level computation process when a predetermined threshold is not met, it is possible to prevent unnecessary processing from taking place.

Figure 14A:
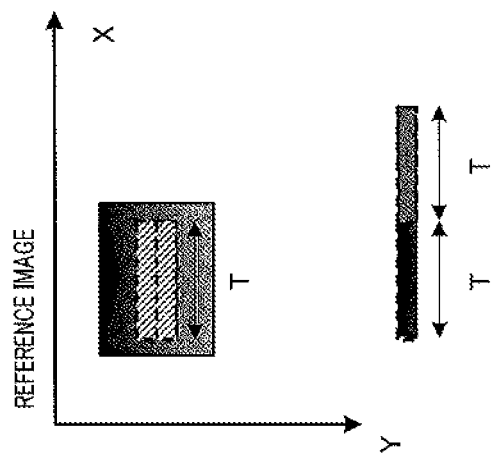
FIGS. 14A through 14D are diagrams illustrating a concept of a process of an image concatenating section.
Figure 14B:
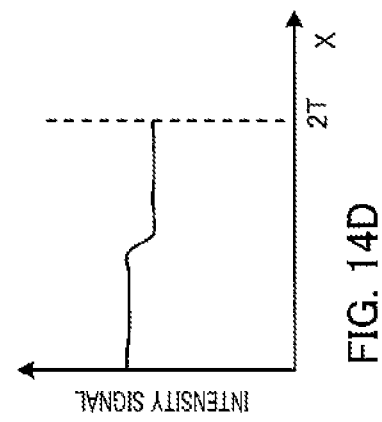
Figure 14C:
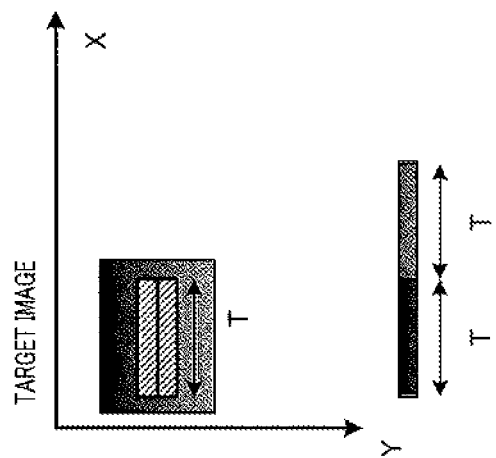
Figure 14D:
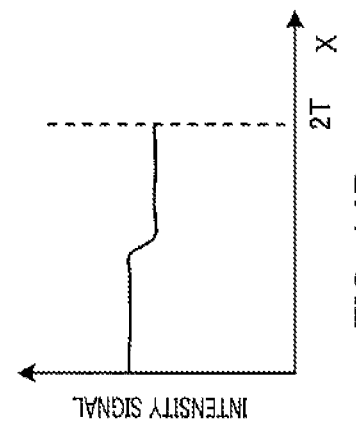

FIGS. 14A through 14D are diagrams illustrating a concept of a process of image concatenating section 402. FIG. 14A shows how unit partial target images for subpixel estimation are extracted from a target image, and it shows a one-dimensional image data sequence in which two extracted unit partial target images for subpixel estimation are concatenated (i.e., a concatenated target image data sequence). FIG. 14B shows the intensity signal of the concatenated target image data sequence. FIG. 14C shows how unit partial reference images for subpixel estimation are extracted from a reference image, and it shows a one-dimensional image data sequence in which two extracted unit partial reference images for subpixel estimation are concatenated (i.e., a concatenated reference image data sequence). FIG. 14D shows the intensity signal of the concatenated reference image data sequence. FIGS. 14A through 14D depict a case where no frequent intensity value changes are observed (i.e., there are almost no high-frequency components in the intensity signals) in any of the unit partial target image and the unit partial reference image.

Thus, a case will now be considered where there are no frequent intensity value changes in any of unit partial target images for subpixel estimation and unit partial reference images for subpixel estimation, and where, at the same time, intensity values do change from one unit partial target image for subpixel estimation to another or from one unit partial reference image for subpixel estimation to another (i.e., intensity values change in the Y-axis direction (vertical direction)). In this case, the disparity between unit partial target images for subpixel estimation and unit partial reference images for subpixel estimation (i.e., the phase difference between the intensity signal of unit partial target images for subpixel estimation and the intensity signal of unit partial reference images for subpixel estimation) ends up appearing to be zero. Consequently, it is not possible to compute the correct disparity, which becomes a significant cause of disparity computation accuracy degradation. Accordingly, it is preferable that such low-frequency components be eliminated through a high-frequency determination process prior to an image concatenating process.

Thus, with the present embodiment, it is only in the case described below that high-frequency component determination section 601 of stereo image processing apparatus 100 has the processes of image extraction section 401, image concatenating section 402, filtering section 403, and peak position detection section 104 executed. The "case" referred to above is one where the amplitudes of the high-frequency components in the image signal corresponding to the first partial region (in this case, the unit partial target image) and the image signal corresponding to the second partial region (in this case, the unit partial reference image) are equal to or greater than a threshold.

By so doing, it is possible to prevent unnecessary processes from being executed when it is difficult to compute an accurate disparity.

Although the description above involves a case where high-frequency component determination section 601 is applied to filter section 103 according Embodiment 2, this is by no means limiting, and high-frequency component determination section 601 may also be applied to filter section 103 according to Embodiment 1.

The embodiments above have been described taking as examples cases where the present invention is configured with hardware. However, the present invention may also be realized through software.

OTHER EMBODIMENTS (1) For the embodiments above, descriptions have been provided with regard to cases where the shift between the target image and the reference image is coarsely detected on a "pixel level" at image matching section 102, and where the shift is thereafter finely detected on a "subpixel level" by peak position detection section 104. In other words, descriptions have been provided with regard to cases where shifts are computed in two stages. However, the present invention is by no means limited as such, and is also applicable to cases where shifts are computed in a single stage.

(2) The functional blocks used in the descriptions for the embodiments above are typically realized as LSIs, which are integrated circuits. These may be individual chips, or some or all of them may be integrated into a single chip. Although the term LSI is used above, depending on the level of integration, they may also be referred to as IC, system LSI, super LSI, or ultra LSI.

The method of circuit integration is by no means limited to LSI, and may instead be realized through dedicated circuits or general-purpose processors. Field programmable gate arrays (FPGAs), which are programmable after LSI fabrication, or reconfigurable processors, whose connections and settings of circuit cells inside the LSI are reconfigurable, may also be used.

Furthermore, should there arise a technique for circuit integration that replaces LSI due to advancements in semiconductor technology or through other derivative techniques, such a technique may naturally be employed to integrate functional blocks. Applications of biotechnology, and/or the like, are conceivable possibilities.

The disclosure of the specification, drawings, and abstract included in Japanese Patent Application No. 2010-248691, filed on Nov. 5, 2010, is incorporated herein by reference in its entirety.

INDUSTRIAL APPLICABILITY

A stereo image processing apparatus and stereo image processing method of the present invention are useful as they are capable of computing disparity accurately even when the target image region only occupies a small region in the captured images.

REFERENCE SIGNS LIST

100 Stereo image processing apparatus
101 Stereo image acquisition section

102 Image matching section
103 Filter section
104 Peak position detection section
401 Image extraction section
402 Image concatenating section
403 Filtering section
501 Low-frequency component suppression section
601 High-frequency component determination section

The invention claimed is:

1. A stereo image processing apparatus that computes a shift between a target image and a reference image that form stereo images, the stereo image processing apparatus comprising:
   an extraction section that extracts M many divisional target images obtained by dividing a first partial region in the target image into N parts (where N is a natural number equal to or greater than 2, and M is a natural number equal to or greater than 2 but equal to or less than N), and extracts M many divisional reference images obtained by dividing a second partial region in the reference image corresponding to the first partial region in the target image into N parts;
   a concatenating section that forms a first concatenated data sequence by concatenating, in series, M many data sequences, each of which comprises intensity values of a corresponding one of the divisional target images, and forms a second concatenated data sequence by concatenating, in series, M many data sequences, each of which comprises intensity values of a corresponding one of the divisional reference images;
   a filtering section that computes inverted phase filter coefficients by reversing the data order of the first concatenated data sequence, and performs filtering on the second concatenated data sequence using the inverted phase filter coefficients; and
   a computation section that computes the shift based on a peak position in a filtering result of the filtering section.

2. The stereo image processing apparatus according to claim 1, further comprising a suppression section that suppresses, relative to high-frequency components, low-frequency components in an image signal corresponding to the first partial region and in an image signal corresponding to the second partial region, the suppression section being provided at an input stage for the extraction section.

3. The stereo image processing apparatus according to claim 1, further comprising a control section that causes the processes of the extraction section, the concatenating section, the filtering section, and the computation section to be executed, only when amplitudes of high-frequency components in an image signal corresponding to the first partial region and in an image signal corresponding to the second partial region are equal to or greater than a threshold.

4. The stereo image processing apparatus according to claim 2, wherein a frequency value that divides frequency components into the low-frequency components and the high-frequency components is $1/(2T)$, where T is a width of the first partial region and the second partial region.

5. The stereo image processing apparatus according to claim 1 further comprising a computation section that computes a pixel-level shift between the target image and the reference image, wherein
   the value of M and the value of N are set based on the computed pixel-level shift.

6. A stereo image processing method that computes a shift between a target image and a reference image that form stereo images, the stereo image processing method comprising:
   extracting M many divisional target images obtained by dividing a first partial region in the target image into N parts (where N is a natural number equal to or greater than 2, and M is a natural number equal to or greater than 2 but equal to or less than N), and extracting M many divisional reference images obtained by dividing a second partial region in the reference image corresponding to the first partial region in the target image into N parts;
   forming a first concatenated data sequence by concatenating, in series, M many data sequences, each of which comprises intensity values of a corresponding one of the divisional target images, and forming a second concatenated data sequence by concatenating, in series, M many data sequences, each of which comprises intensity values of a corresponding one of the divisional reference images;
   computing inverted phase filter coefficients by reversing the data order of the first concatenated data sequence, and performing filtering on the second concatenated data sequence using the inverted phase filter coefficients; and
   computing the shift based on a peak position in a result of the filtering.

* * * * *